United States Patent [19]

Good et al.

[11] 4,313,503

[45] Feb. 2, 1982

[54] AGRICULTURAL IMPLEMENT

[75] Inventors: Garry R. Good; Charles W. Anderson, both of Kewanee, Ill.

[73] Assignee: Chromalloy American Corporation, St. Louis, Mo.

[21] Appl. No.: 55,348

[22] Filed: Jul. 6, 1979

[51] Int. Cl.³ ........................................... A01B 35/18
[52] U.S. Cl. ................... 172/140; 172/178; 172/484; 172/583; 172/771
[58] Field of Search ............... 172/177, 178, 179, 180, 172/181, 771, 770, 454, 483, 484, 497, 583, 166, 140, 583, 504, 197

[56] References Cited

U.S. PATENT DOCUMENTS

| | | | |
|---|---|---|---|
| 349,334 | 9/1886 | Beek | 172/771 |
| 2,671,973 | 3/1954 | Bensel | 172/197 X |
| 3,039,542 | 6/1962 | Vonville | 172/771 |
| 3,757,871 | 9/1973 | Maust | 172/178 |
| 4,187,916 | 2/1980 | Harden | 172/146 |
| 4,243,104 | 1/1981 | Sipos | 172/148 |

OTHER PUBLICATIONS

Brinkley-Wilbeck, Advertizing Brochure of the Brinkley Co., Warrenton, Mo.
New Brillion Soil Builder Coulter Chisel, Brillion Iron Works, Brillion, Wis.
Glencoe Soil Saver Advertizing Brochure of Dynamics Corp. of America, Bloomington, Il.
Bush Hog Soil Hog, Advertizing Brochure of the Allied Products Corp.

*Primary Examiner*—Richard J. Johnson
*Attorney, Agent, or Firm*—Fitch, Even, Tabin, Flannery & Welsh

[57] ABSTRACT

An agricultural implement having a primary frame on which is mounted an adjustable secondary support frame through connecting links and depth control screws enabling adjustment of the secondary support frame relative to the primary frame while maintaining the secondary support frame in generally parallel relation to the plane of the primary frame. First tools such as disk gangs are carried by the secondary support frame, while different type tools such as shank mounted earth working points and contiguous moldboards are mounted on the primary frame spaced from the first tools. Wheels mounted on the primary frame enable raising of the primary and secondary frames and associated tools for transport, and are adjustable to serve as gauge wheels for the earth working points and moldboards.

9 Claims, 10 Drawing Figures

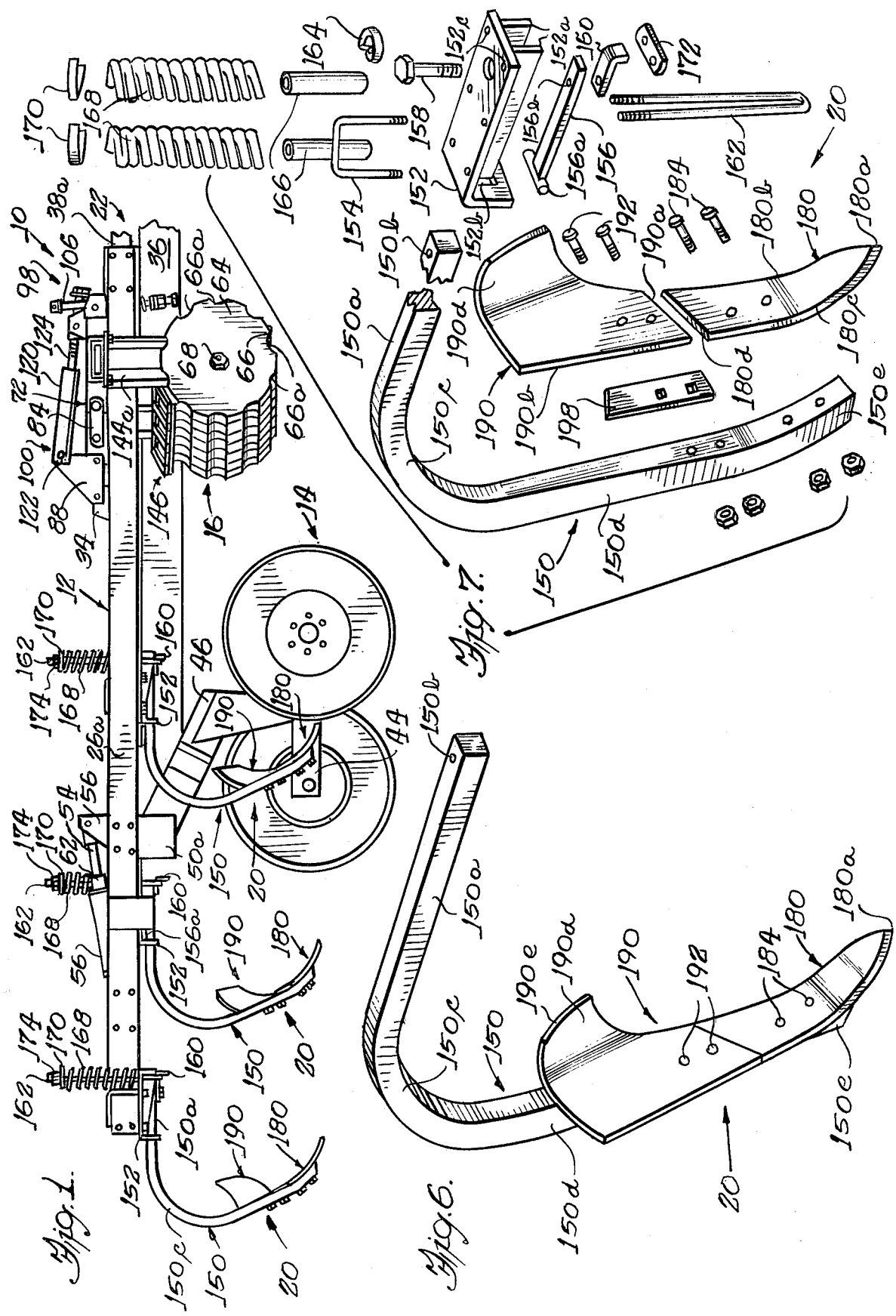

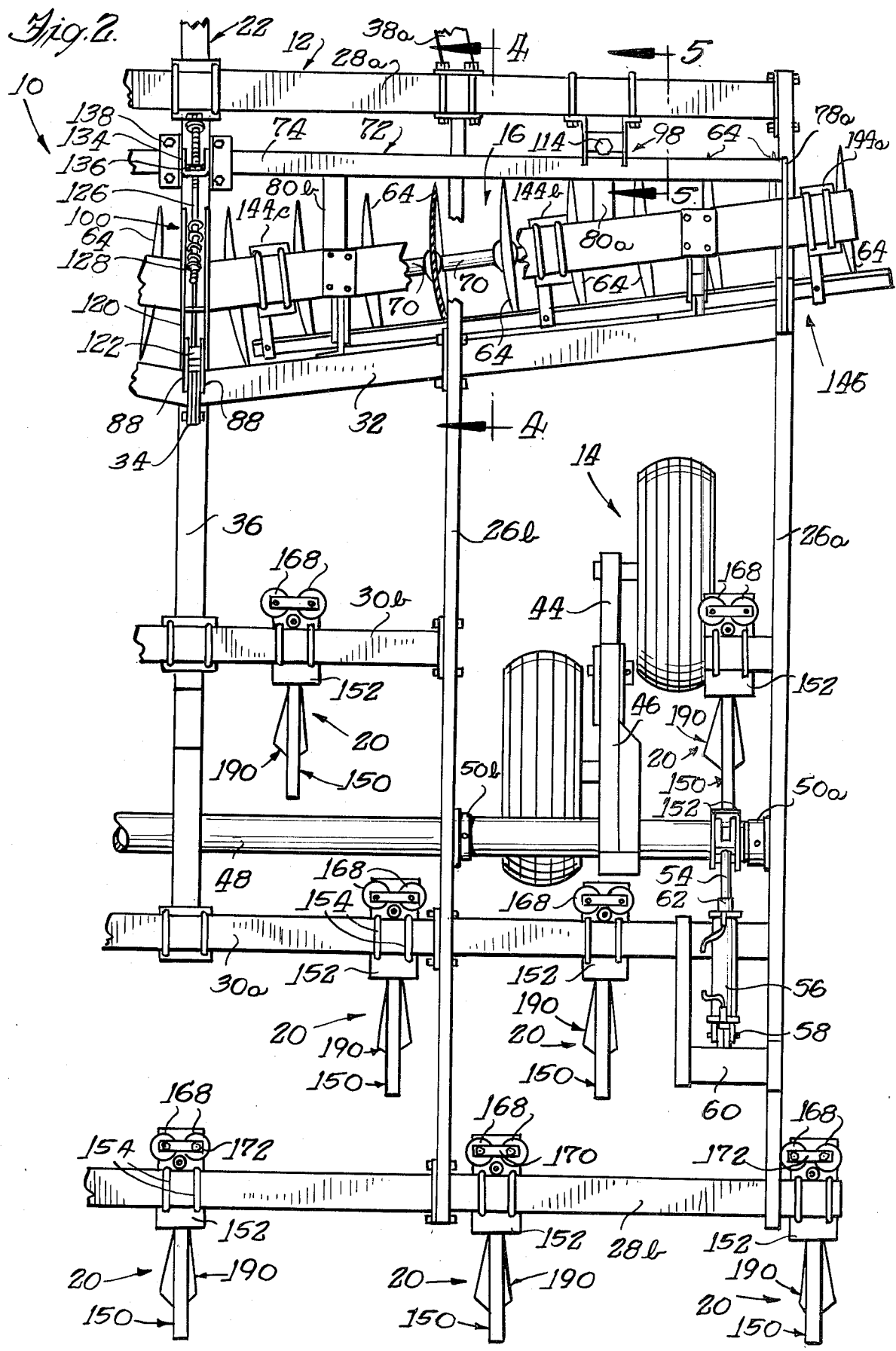

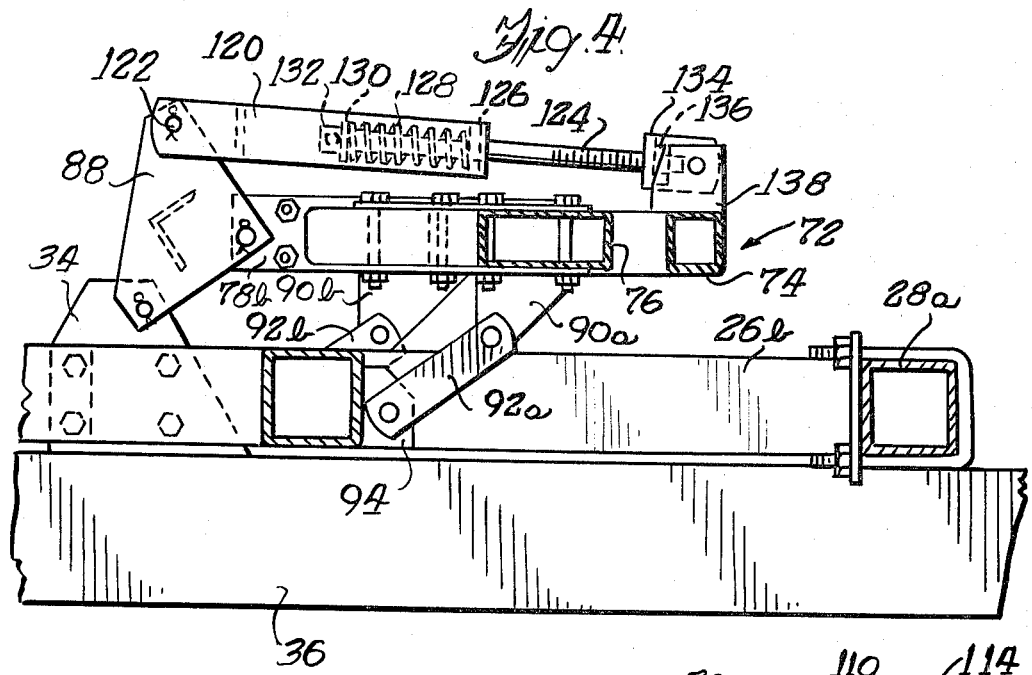
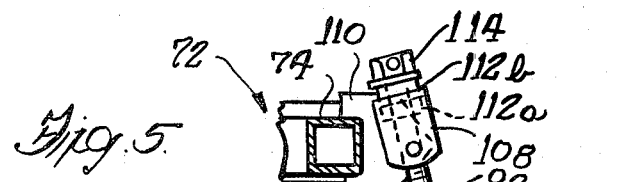
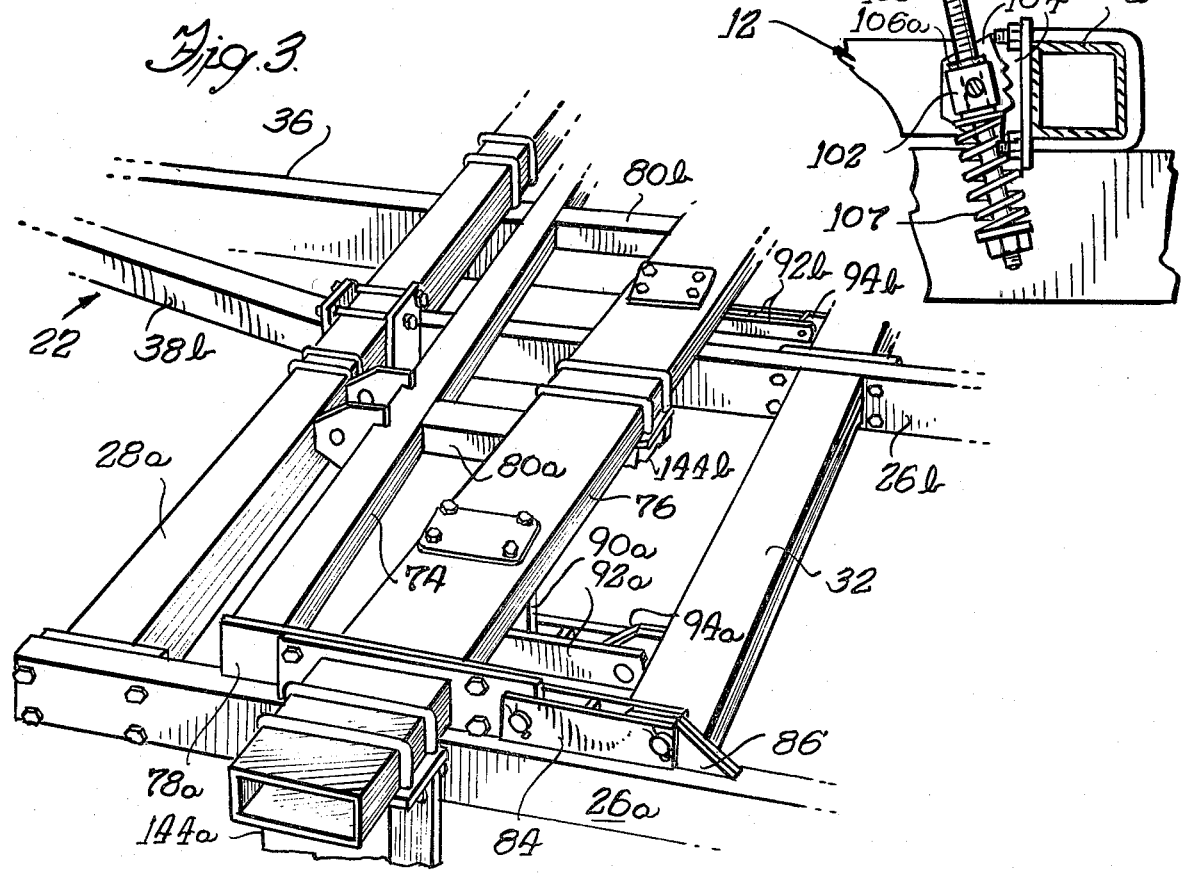

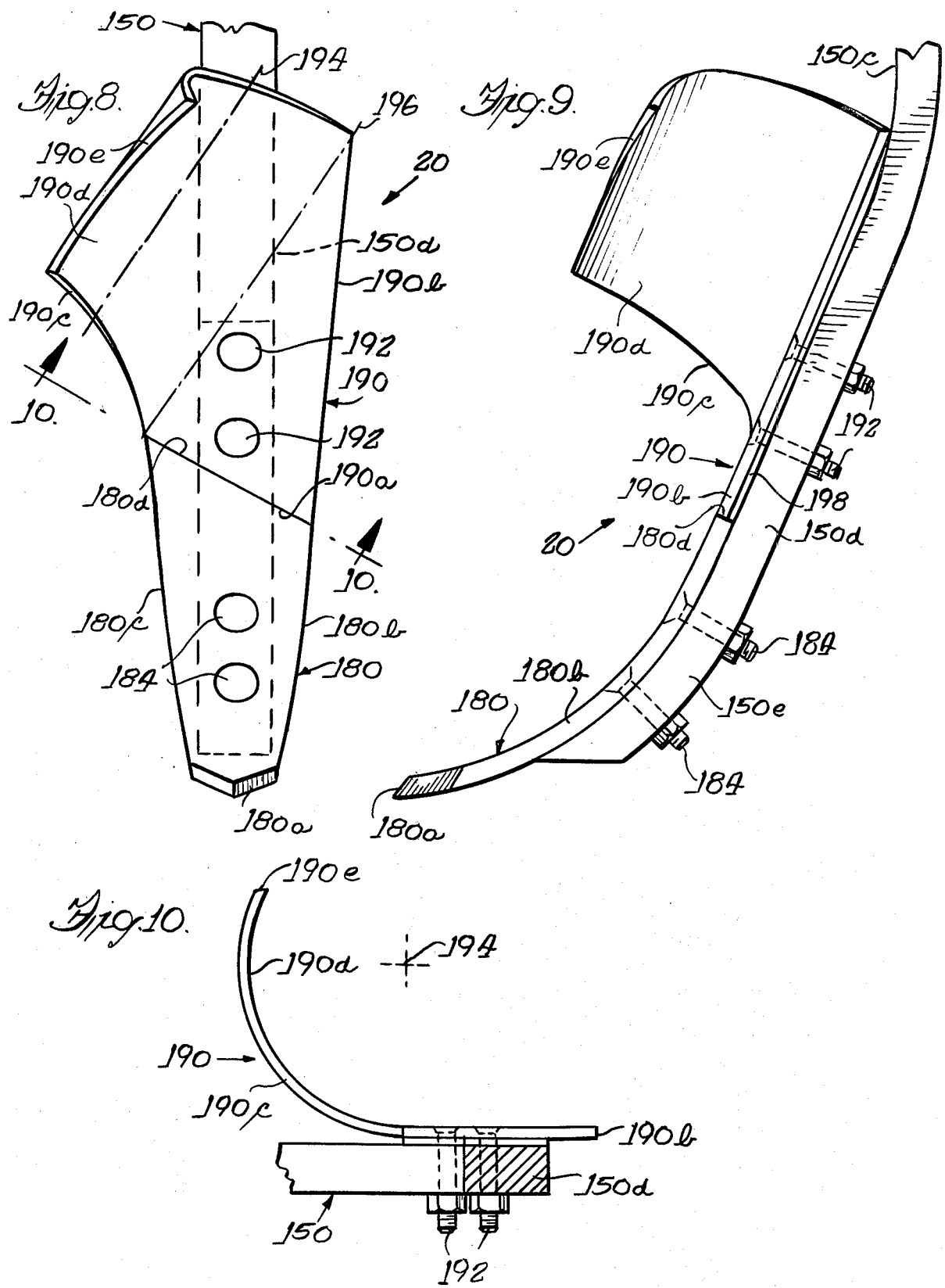

AGRICULTURAL IMPLEMENT

The present invention relates generally to agricultural implements, and more particularly to a novel agricultural implement having a primary frame on which is mounted a secondary support frame adjustable relative to the primary frame and carrying tools thereon such as disk gangs. Different type tools such as shank mounted earth working tools are mounted on the primary frame which also has wheels adjustable thereon to raise and lower the tools relative to ground.

It is a common practice in many agricultural areas to work the fields following crop harvesting so as to break up the crop residue and effect tillage which prepares the ground for subsequent operations such as field cultivating and planting. With growing interest in conservation practices, chisel plows have become more widely used for primary tillage. In light crop residues, such as soybean and wheat stubble, chisel plows have proven reasonably adequate for primary tillage purposes. However, in the case of heavier surface residues, such as heavy cornstalks, the known chisel plows leave too much surface residue to satisfy most farmers, particularly if there is no prior disking or stalk chopping. Heavy surface residue on the fields during planting makes weed control difficult and may interfere with the subsequent operations. Accordingly, there exists a significant need for an agricultural implement which will eliminate the shortcomings of chisel plows and which is effective in use with both heavy and light crop residues to chop, cut, turn and incorporate most of the residue while at the same time leaving enough residue on the surface to retard wind and water erosion during the intervening winter period.

One of the primary objects of the present invention is to provide a novel agricultural implement in the form of a tillage tool having improved tillage capability in both light and heavy crop residue.

A more particular object of the present invention is to provide a novel agricultural implement employing, in combination, first tool means in the form of disk gangs adapted to cut up crop residue, and second tool means in the form of a plurality of shank mounted earth working tools adapted to provide improved turning and mixing of earth and cut residue so as to minimize wind and water erosion.

Another object of the present invention is to provide a novel shank mounted earth working tool for use in an agricultural implement, which tool includes a shank adapted for mounting on the frame of the implement and having a depending end on which is mounted a shaped point and contiguous moldboard which cooperate to break the soil and turn over and incorporate the trash and/or residue so as to trap the residue against the ground with overturned broken soil.

Still another object of the present invention is to provide an agricultural implement having a primary frame on which is mounted a secondary support frame carrying tool means such as disk gangs the axes of which may be angled slightly from positions transverse to the longitudinal axis of the frame. The second support frame is adjustable relative to the primary frame to control the cutting depth of the disk gangs. A plurality of different type tools such as shank mounted earth working tools are mounted on the primary frame which has wheels adjustably mounted thereon in a manner to enable raising of the primary and secondary frames for transport and lowering for tillage, the wheels then serving as gauge wheels for the earth working tools.

A feature of the shank mounted earth working tool in accordance with the present invention lies in the provision of a moldboard portion having a compound curved upper wing portion curved forwardly about an axis of curvature oblique to a plane containing the longitudinal axis of the shank.

Still another feature of the shank mounted earth working tool lies in the provision of a novel shank having a substantially straight first end portion adapted for attachment to the implement frame so as to lie substantially parallel to the ground surface to be worked, the shank having a curved portion continguous to its frame attachment end which terminates in a substantially straight terminal end inclined downwardly in the direction of movement of the implement during working of the soil, the straight terminal portion of the shank being adapted for mounting of a shaped point and curved moldboard thereon such that exposed portions of the point and moldboard force broken earth upwardly and forwardly in the direction of shank movement during operation.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a fragmentary elevational view of an agricultural implement constructed in accordance with the present invention;

FIG. 2 is a fragmentary plan view of the agricultural implement of FIG. 1, portions being broken away for clarity;

FIG. 3 is a fragmentary perspective view illustrating a portion of the implement frame and disk gang support frame;

FIG. 4 is a fragmentary sectional view, on an enlarged scale, taken along line 4—4 of FIG. 2;

FIG. 5 is a fragmentary sectional view, on an enlarged scale, taken along line 5—5 of FIG. 2;

FIG. 6 is a perspective view of a shank mounted earth working tool constructed in accordance with the present invention and as employed in the implement of FIG. 1;

FIG. 7 is an exploded perspective view of the shank mounted earth working tool of FIG. 6 shown with associated cushion mounting means;

FIG. 8 is a fragmentary front elevational view, of a shank mounted earth working tool similar to FIG. 6 but adapted to effect an opposite direction turning of soil than the tool illustrated in FIG. 6;

FIG. 9 is a side elevational view of the shank mounted earth working tool of FIG. 8; and FIG. 10 is a fragmentary transverse sectional view taken substantially along line 10—10 of FIG. 8, looking in the direction of the arrows.

Referring now to the drawings, and in particular to FIGS. 1 and 2, an agricultural implement constructed in accordance with the present invention is indicated generally at 10. Very generally, the agricultural implement 10, which may alternatively be termed a tillage implement, includes frame means in the form of a primary frame 12 which is symmetrical about its longitudinal axis and has pairs of transport wheels, one pair of which is indicated generally at 14, mounted on laterally opposite sides of the primary frame for raising and lowering the primary frame relative to the ground or earth to be worked by the implement. The primary frame 12 supports first working tools in the form of a pair of disk gangs, indicated generally at 16, adjacent its forward end and on laterally opposite sides of the longitudinal axis of the implement, the disk gangs preferably being angled relative to the longitudinal axis of the implement, as best shown in FIG 2.

The primary frame 12 also supports secondary working tools in the form of a plurality of shank mounted earth working tools, each of which is indicated generally at 20, rearwardly of the disk gangs 16. The transport wheels 14 are selectively movable between transport positions, as illustrated in FIG. 1, wherein the primary frame 12 and associated disk gangs 16 and shank mounted earth working tools 20 are elevated from the surface of the earth or ground to be worked, as during transport of the implement, and retracted or non-transport positions wherein the primary frame and associated disk gangs and shank mounted earth working tools are lowered for earth working operation. As will become more apparent hereinbelow, the transport wheels 14 are also employed as gauge wheels to control the working depth of the shank mounted earth working tools 20. The disk gangs 16 are adjustable relative to primary frame means 12 to that with the frame means lowered to obtain the desired working depth of the tools 20, the disk gangs only cut the crop residue left on the ground surface after harvest, and are not intended for use in the conventional disking sense to penetrate the earth so as to turn and mix crop residue and earth as with conventional disks. To facilitate longitudinal movement of the agricultural implement 10 during earth working or transport, the implement includes hitch means, a fragmentary portion of which is indicated at 22, which enables attachment of the implement to a tractor or other draft vehicle, as is known.

Turning now to a more detailed description of the agricultural implement 10, the primary frame 12 includes a plurality of symmetrically positioned longitudinal tubular frame members, two of which are shown at 26a and 26b in FIG. 2, which are connected at their forward and rearward ends to transverse tubular frame members 28a and 28b, respectively. Transverse tubular frame members 30a and 30b are suitably connected to and between the longitudinal frame members 26a and 26b and their symmetrical corresponding counterparts on the opposite side of the frame longitudinal axis, and serve as transverse tool support bars for the tools 20 as will be described more fully hereinbelow. Right-hand and left-hand diagonal frame members, only the right-hand one of which is indicated at 32 in FIG. 2, are also connected to and between the longitudinal frame members 26a, b, the inner ends of the diagonal frame members being secured to an upstanding hinge plate 34 fixed on the upper surface of a hitch pole mounted, as by U-bolts, to the transverse frame members 28a, 30a and 30b. The hitch pole 36 extends forwardly from the primary frame 12 along its longitudinal axis and forms a part of the hitch means 22. The forward end of hitch pole 36 cooperates with the forward ends of symmetrically mounted hitch side braces 38a and 38b to pivotally support a conventional hitch yoke or clevis (not shown) which is adapted for connection to a tractor hitch or the like and is adjustable to maintain the primary frame 12 at a desired attitude relative to the ground surface being worked.

As aforementioned, the wheels 14 enable transport of the implement 10 with the disk gangs 16 and shank mounted earth working tools 20 raised from the ground surface, and are operative to lower the frame 12 and associated disk gangs and earth working tools to predetermined ground engaging relation. In the illustrated embodiment, tandem pairs of wheels are rotatably mounted on the opposite ends of an associated walking beam 44 which is pivoted centrally of its length to the lower end of a support arm 46 the upper end of which is fixed in normal relation to a tubular rock shaft 48 rotatably mounted on the frame 12 through suitable bearing hangers, two of which are indicated at 50a and 50b in FIG. 2, so that the rock shaft extends transversely of the primary frame. Pairs of radial arms 52 are fixed on the opposite ends of the rock shaft 48 and are pivotally connected at their outer ends to the extendable piston 54 of an associated fluid pressure actuated cylinder 56 which is pivotally connected at 58 to a support frame member 60 fixed to the longitudinal frame member 26a. The actuating cylinder 56 is connected in circuit with a source of fluid pressure (not shown) and a suitable control valve (not shown) to facilitate selective raising and lowering the wheels 14 relative to primary frame 12, as is known. Means are provided to limit the extent to which the primary frame 12 may be lowered relative to the wheels 14 so as to effect predetermined depth entry of the shank mounted working tools 20 into the earth during operation. In the illustrated embodiment, such means may comprise spacer sleeves, one of which is indicated at 62 in FIG. 2, of predetermined length mounted coaxially on the extendable pistons 54 of the actuating cylinders 56, the sleeves 62 being interchangable with different length sleeves to selectively vary the extent to which the pistons may be retracted and thereby vary the extent to which the frame 12 may be lowered relative to ground. The wheels 14 and aforedescribed manner of mounting them on the primary frame 12 are of generally known design and do not, per se, form part of the present invention, it being understood that the frame 12 may be adjustably mounted on transport wheels in substantially any suitable manner.

As aforementioned, during operation of the agricultural implement 10, the disk gangs 16 serve to cut any crop residue on the ground surface into relatively small size portions to facilitate intermixing with the earth broken up and turned by the earth working tools 20. Each disk gang 16 includes a plurality of identically shaped disks or disk blades 64 each of which has a substantially circular sharp cutting edge 66. In the illustrated embodiment, the cutting edges 66 are shown as being interrupted by equidistantly circumferentially spaced notches 66a, as best seen in FIG. 1, but the disk cutting edges need not be notched. The disks of each disk gang are mounted in axially aligned relation on a common axial support shaft 68 and are equidistantly spaced thereon by spacer sleeves 70 in a known manner.

It is highly desirable that cutting up of the crop residue by the disk gangs be accomplished without ridging the ground or field surface. Because the wheels 14 are adjusted relative to the primary frame 12 to obtain predetermined depth penetration of the shank mounted earth working tools 20, such as a depth of in the range of approximately 8–14 inches, it is desirable that the disk gangs 16 be adjustably mounted on the frame 12 so that the disk gangs may be adjusted to obtain cutting of the crop residue without ridging the ground for any given depth at which the earth working tools penetrate the ground during operation. To facilitate adjustment of the disk gangs 16 relative to the frame means 12, the disk gangs are mounted on a disk gang support frame, indicated generally at 72 and termed the secondary support frame, which overlies and extends generally transversely of the primary frame 12 and is adapted to be raised and lowered relative to frame 12 while being maintained substantially parallel thereto. With particular reference to FIGS. 3-5, taken in conjunction with FIGS. 1 and 2, the disk gang support frame 72 comprises two symmetrical frame sections secured at their inner ends so as to establish a rigid framework having a forward end defined by forward tubular frame member 74 which is fixed to a rearward support frame member 76 through end plates 78a and 78b and intermediate struts 80a and 80b.

The support frame member 76 defines the rearward end of the secondary support frame 72.

The disk gang support frame 72 is mounted on the primary frame 12 through a parallelogram linkage arrangement so that the disk gang support frame is maintained in substantially parallel relation to the frame means 12 as it is raised and lowered relative to frame 12. To this end, each outer end plate 78a is connected through pairs of pivot links 84 to an upstanding anchor plate 86 fixed on the upper surface of the corresponding longitudinal frame member 26a, while the central end plates 78b are connected through triangular shaped pivot links 88 to the aforementioned upstanding hinge plate 34. Pairs of anchor plates 90a and 90b are fixed to the lower surface of the frame member 76 on opposite sides of center thereof, the anchor plates 90a, b being connected through associated pivot links 92a and 92b, respectively, to anchor plates 94a and 94b fixed on the forward edge of the diagonal frame members 32. The pivot links 84, 88, 92a and 92b maintain the disk gang support frame 72 in substantially parallel relation to the plane of the primary frame 12 when the disk gang support frame is raised and lowered relative to the frame 12.

To enable raising or lowering of the disk gang support frame 72 to regulate the running depth of the disk gangs 16 during the operation, a pair of laterally spaced depth control adjusting screw assemblies, each of which is indicated at 98, and a central depth control adjusting link assembly 100 are provided which cooperate with the disk gang support frame and the primary frame 12 and are manually adjustable to raise or lower the disk gang support frame relative to the primary frame. With particular reference to FIG. 5, each depth control adjusting screw assembly 98 includes a trunnion block 102 which is pivotally mounted on the transverse frame member 28a through a pair of trunnion brackets 104 fixed on frame member 28a through U-shaped bolts. The trunnion block 102 has a transverse bore which receives an adjusting screw 106 therethrough so that the adjusting screw is both longitudinally and rotatably movable relative to the trunnion block. The extent of longitudinal movement of adjustment screw 106 relative to the trunnion is limited by a stop washer 106a fixed on the screw and a coil spring 107 supported on the lower end of the adjustment screw. The portion of the adjusting screw 106 extending upwardly from trunnion block 102 is threaded and is received through an inverted U-shaped pivot bracket 108 which is pivotally mounted on mounting plates 110 fixed on the forward frame member 74 of the disk gangs support frame 72. An internally threaded bushing 112a is fixed to the web of the pivot bracket 108 and receives the adjusting screw 106 in threaded relation therethrough. A locking nut 112b is mounted on adjusting screw 106 above bracket 108 for locking the screw in selected position. A hex-head nut 114 is fixed on the upper end of each adjusting screw 106 to enable manual rotation of the adjustment screws 106 to raise and lower the disk gang support frame 72 relative to the primary frame 12. The compression spring 107 maintains the associated adjusting screw 106 in relatively fixed axial relation within the corresponding trunnion block 102 but allows upward movement thereof when the disk gangs are subjected to predetermined shock loading which might otherwise cause damage thereto.

The central depth control adjusting link assembly 100, which is best illustrated in FIG. 4, is somewhat similar to the depth control adjusting screw assemblies 98 and includes a clevis or yoke link 120 which is pivotally connected at 122 to the triangular shaped pivot link 88. An adjusting screw 124 is received through a suitable opening in a cross plate 126 of clevis 120, and has a compression spring 128 coaxial on its rearward end which acts between the cross plate 126 and a washer 130 and bushing 132 fixed on the rearward end of the adjusting screw. The forward end of the adjusting screw 124 is received through a suitable opening in the transverse web of a U-shaped pivot bracket 134 and has threaded connection with an internally threaded bushing 136 fixed to the pivot bracket 134. The pivot bracket 134 is pivotally connected to an upstanding bracket 138 fixed on the upper surface of the forward frame member 74 of the disk gangs support frame 72. In raising and lowering the disk gang support frame 72, the depth control adjusting screw assemblies 98 are first adjusted, followed by adjustment of the center depth control adjusting link assembly 100 which is utilized to hold down the center of the disk gang support frame so as to be level with outer ends. If during operation, the center of the disk gang support frame 72 runs high, the adjusting screw 124 is drawn up slightly to put more downward pressure on the center of the disk gangs support frame.

The axial support shafts 68 of the disk gangs 16 are journaled within suitable bearings secured on the lower ends of support standards 144a, b and c fixed to the lower surface of opposite ends of the support frame member 76, as by U-shaped bolts, it being understood that the axes of the disk gangs underlie their corresponding ends of the support frame 76 in parallel relation thereto. As illustrated in FIG. 2, the opposite ends of the support frame member 76 are angled slightly forwardly from positions transverse to the longitudinal axis of the frame 12 so that the axes of the associated disk gangs are similarly angled relative to the longitudinal axis of the implement. Preferably, the axes of the disk gangs are angled forwardly from a plane transverse to the longitudinal axis of frame 12 by equal angles in the range of between approximately 5-10 degrees.

The disks 64 have relatively shallow concavity and are mounted so that their concave surfaces face outwardly from the longitudinal axis of the implement, the disks being spaced longitudinally along their respective support shafts sufficiently to avoid plugging by crop residue or trash during cutting and slicing of residue and/or chopping of standing stalks. Disk blade scraper assemblies 146 are preferably supported by the standards 144a-c, each scraper assembly having a plurality of scraper blades adapted to scrap the inner concave surfaces of the disk blades 64 so as to scrape dirt and debris therefrom in a known manner.

In accordance with an important feature of the present invention, the shank mounted earth working tools 20 are adapted to provide highly efficient turning of the upper soil and crop residue or trash cut by the disk blades 16 and incorporate a substantial portion of the cut residue so that it does not interfere with subsequent field operations, while leaving sufficient residue on the surface of the ground to retard wind and water erosion.

With particular reference to FIGS. 6–10, taken in conjunction with FIGS. 1 and 2, each shank mounted earth working tool includes a metallic shank, indicated generally at 105, of substantially rectangular cross-sectional configuration and having a first straight end portion 150a which facilitates connection of the shank to either the rearward transverse frame member 28b or one of the intermediate transverse primary frame members 30a and 30b of the frame 12. The shank 150 of each earth working tool 20 may be mounted on the frame 12 through fixed mounting means or suitable cushion mounting means of known design so that shock loads to which earth-working tools may be subjected during operation will be sufficiently dissipated to prevent damage to the associated earth working tool.

In the illustrated embodiment, cushion mounting means is provided for each earth working tool 20 which includes an L-shaped base plate 152 mounted on the lower surface of a selected one of the transverse frame members 28b, 30a or 30b by a pair of U-shaped bolts 154. The base plate 152 has a pair downwardly depending plates 152a spaced laterally a distance sufficient to receive a pivot plate 156 upwardly therebetween so that a cylindrical pivot bar 156a is disposed within the corner of the base plate. The base plate has an opening 152b of sufficient size to receive the mounting end portion 150a of a shank 150 therethrough so that a transverse bore 150b in the end of the shank is aligned with a transverse bore 156b in the pivot plate 156. A bolt 158 is then inserted downwardly through aligned bores 156b and 150b and through an L-shaped clip 160. The free ends of a U-bolt 162 are then inserted upwardly through suitable openings 152c in the base plate 152 and a lower spring base 164, a stop tube 166, a coil compression spring 168 and an upper spring base 170 are assembled downwardly over each end of the U-bolt after which a connecting plate 172 is mounted over both ends of the U-bolt and nuts 174 are affixed thereon. In this manner, impact forces acting on any of the earth working tools 20 as the implement is moved in a forward longitudinal direction during operation, and which impact forces exceed a predetermined limit as established by selection of the compression springs 168, will cause the associated shank 150 to pivot about the corresponding pivot bar 156a and effect a corresponding compression of the springs 168. Upon release of such an impact force, the springs 168 will return the shank 150 to its normal operating position wherein the end 150a is disposed substantially parallel to the ground surface. The springs 168 thus act to dampen shock loads acting on the associated shank mounted earth working tools.

The shank 150 is uniformly curved at 150c about a fixed radius of curvature after which the curved portion 150c terminates in a downwardly and forwardly inclined straight intermediate shank portion 150d. The straight shank portion 150d terminates at its lower end in a slightly forwardly curved lower end 150e which is curved uniformly about a fixed radius of curvature, as best seen in FIG. 9. The longitudinal axis of each shank 150 is planar and, with the shank mounted on primary frame 12, lies in a plane normal to the plane of the primary frame. In the illustrated embodiment, each straight intermediate shank portion 150d is inclined downwardly and forwardly so as to subtend an angle of approximately 25 degrees with a line lying in the plane of the shank and perpendicular to the axis of the straight shank portion 150a.

Each of the shank mounted earth working tools 20 includes a metallic shaped point, indicated generally at 180, which defines a lower earth penetrating cutting point 180a preferably having beveled edge surfaces, as best illustrated in FIGS. 8 and 9. The point 180 is mounted on the lower terminal end 150e of the shank 150 through a pair of connecting bolts 184 so that a lower portion of the point extends downwardly and forwardly from the lower end of the shank. The major portion of the point 180 is uniformly curved about a fixed axis of curvature similar to the curvature of the curved end 150e of the shank so that the point mates with the shank when mounted thereon, the upper portion of the point 180 having a generally planer side profile so as to lie against the lower portion of the straight intermediate shank portion 150d.

As best illustrated in FIG. 8, the point 180 is relative narrow in lateral width and has upwardly and outwardly diverging longitudinal edges 180b and 180c which, in the illustrated embodiment, are spaced apart approximately two inches at the intersection of the lateral edges with the point 180a, and are spaced apart approximately 4½ inches at their upper ends. The uppermost edge 180d of the point 180 may be inclined or substantially transverse to the longitudinal axis of the point and the associated shank 150. In this manner, the shaped point 180 is relatively narrow in front elevational profile and readily penetrates the earth to initiate breaking up of the earth.

As aforementioned, the earth working tools 20 serve to both break up the soil and effect turning and intermixing of the soil with the crop residue cut up by the disk gangs 16 so as to incorporate the cut residue to trash into the earth; that is, at least partially bury the cut residue under the soil broken up by the point 180. To this end, each earthworking tool 20 includes a moldboard portion, indicated generally at 190, which is mounted on the straight intermediate portion 150d of the corresponding shank 150 through connector bolts 192. The moldboard 190 has a lower inclined edge 190a formed to abut the inclined upper edge 180d on the associated point 180, and has lateral side edges 190b and 190c which are formed at their lower ends to provide coplanar upward extensions of the lateral edges 180b and 180c, respectively, on the associated point 180.

In accordance with an important feature of the earth working tools 20, each moldboard 190 has a laterally outwardly extending wing portion 190d which terminates in an outer lateral edge 190e and is curved uniformly forwardly about a fixed axis of curvature, indicated at 194 in FIGS. 8 and 10, so as to establish a concave moldboard wing surface relative to the direction of movement of the earth working tools during operation. The curvature of the moldboard wing 190d initiates from a line 196 (FIG. 8) lying in the plane of the remaining planar portion of the moldboard 190 attached to the straight intermediate shank portion 150d. The axis of curvature 194 is parallel to line 196 and preferably subtends an oblique angle of approximately 30–50 degrees with a plane containing the longitudinal axis of the corresponding shank 150. The laterally extending curved wing portion 190d of each moldboard 190 subtends an angle of curvature of approximately 120 degrees about its axis of curvature 194, as considered in the plane of FIG. 10, and may thus be defined as forming a compound curvature in that the wing portion curves laterally outwardly from the axis of the associated shank portion 150d and is further curved forwardly about axis 194 so as to establish a concave curvature relative to its direction of travel during operation. In the illustrated embodiment, the moldboard portions 190 are made of a thinner gage metallic stock than the associated points 180 so that a suitable shim 198 is positioned between each moldboard 190 and its associated shank 150, as best seen in FIG. 9.

It will be noted from FIG. 2 that the moldboards 190 on the earth working tools 20 have both "right-hand" and "left-hand" curvature so that earth broken by the associated point 180 may be turned in selected directions depending upon the selection and placement of the earth working tools. In accordance with a feature of the shank mounted earth working tools 20, the upper portion of each point 180 and substantially the total height of the planer portions of the moldboards 190 attached to the straight intermediate portions 150d of the shanks 150 are inclined with the corresponding shank portions 150d so that earth broken up by the points 180 is forced upwardly and forwardly by the non-penetrating portions of the points 180 and the associated planar portions of the moldboards 190. This provides a significant advantage in that the earth broken by the points is not forced back downwardly toward the ground as it slides up the exposed portion of the point and the contiguous associated moldboard 190.

Depending upon the soil conditions, it may be desirable to effect penetration of the cutting points 180 to depths in the range of approximately 8-14 inches. The points 180 of the working tools 20 are made of sufficient length to effect such penetration while the upper planar portions of the points 180 and substantially the full forwardly exposed surfaces of the corresponding moldboards 190 remain above ground level to effect the desired turning and intermixing of broken soil with the crop residue and trash cut by the disk gangs 16.

Thus, in accordance with the present invention, an agricultural implement is provided which, in the illustrated embodiment provides a unique tillage action to cut crop residue remaining on the ground following harvesting without the disks forming ridges in the earth surface, followed by the earth working tools 20 being operative to turn and incorporate the upper soil and cut residue or trash so as to prepare the field for subsequent operations while at the same time leaving sufficient residue on the surface to retard winds and water erosion. By independent adjustment of the disk gangs 16 relative to the frame means 12, the disk gangs may be readily adjusted to effect a desired depth of, for example, 4-6 inches, to cut the crop residue to trash when the wheels 14 are adjusted to effect a predetermined penetration of the earth working tools 20.

While a preferred embodiment of the present invention has been illustrated and described, it will be understood that changes and modifications may be made therein without departing from the invention in its broader aspects. Various features of the invention are defined in the following claims.

What is claimed is:

1. An agricultural implement comprising, in combination,
    a generally planar primary frame having front and rear ends and defining a longitudinal axis,
    hitch means connected to the front end of said primary frame for enabling said primary frame to be drawn generally in the direction of its longitudinal axis,
    a secondary support frame juxtaposed to said primary frame intermediate said front and rear ends thereof, said secondary support frame extending substantially transverse to the longitudinal axis of said primary frame and having a generally planar framework comprising fixedly connected forward and rearward frame members, pairs of laterally spaced parallel links pivotally connected at their opposite ends, respectively, to one of said forward and rearward frame members of said secondary support frame and to said primary frame so as to define at least two parallelogram linkage arrangements interconnecting said one of said frame members to said primary frame, at least one depth control adjusting screw connecting the other of said forward and rearward frame members of said secondary support frame to said primary frame and cooperating with said parallelogram linkage arrangements so as to support said secondary support frame in generally parallel relation to the plane of said primary frame and enable selective adjustment of said secondary support frame relative to said primary frame while maintaining said parallel relation therebetween,
    first tool means comprising at least one gang of residue cutting elements mounted on said secondary support frame for movement therewith relative to said primary frame,
    second tool means including a plurality of earth working tools mounted on said primary frame and spaced from said secondary support frame,
    and wheel means mounted on said primary frame and selectively adjustable relative to said primary frame to enable raising of said primary frame and said secondary support frame to positions wherein said first and second tool means are raised from the ground for transport of said implement, and to enable lowering of said primary frame and secondary support frame to positions facilitating ground engagement of said first and second tool means.

2. An agricultural implement as defined in claim 1 wherein said first tool means includes at least one disk gang mounted on said secondary support frame and having a plurality of substantially identical disks each of which has a peripheral cutting edge adapted to cut crop residue when said disks are in operative ground engaging positions.

3. An agricultural implement as defined in claim 2 wherein said peripheral cutting edges of said disks are generally circular and have a plurality of circumferentially spaced notches formed thereon to facilitate cutting of crop residue during operation.

4. An agricultural implement as defined in claim 1 wherein said first tool means comprises a pair of disk gangs mounted on said secondary support frame, said disk gangs each having a longitudinal axis and each being supported so that its longitudinal axis is inclined forwardly from a position transverse to said longitudinal axis of said frame means.

5. An agricultural implement as defined in claim 1 wherein each of said earth working tools includes a shank having one end attached to said primary frame so that the longitudinal axis of said shank lies in a plane substantially normal to the plane of said primary frame, said shanks each having a downwardly and forwardly inclined portion defining a terminal end, an earth penetrating point mounted on said terminal end, a moldboard mounted on said shank above and contiguous to said point so that said point and moldboard define a uniform forwardly facing working surface, said moldboard having a lateral wing portion curved concavely forwardly about an axis subtending an acute angle with a plane containing the longitudinal axis of the associated shank.

6. An agricultural implement as defined in claim 1 including a pair of laterally spaced depth control adjusting screws connecting said other of said forward and rearward frame members of said secondary support frame to said primary frame, and an additional depth control adjusting screw interconnecting the center of said secondary support frame to said primary frame and enabling selective positioning of the center of said secondary support frame independent of said pair of laterally spaced depth control adjusting screws.

7. An agricultural implement as defined in claim 1 including resilient means cooperative with said depth control adjusting screw in a manner to enable relative movement between said secondary support frame and said primary frame when said secondary frame is subjected to a predetermined impact force.

8. An agricultural implement as defined in claim 1 wherein said secondary support frame is mounted in overlying relation to said primary frame adjacent said front end of said primary frame, and including at least one disk gang carried by said secondary support frame, said second tool means comprising a plurality of earth working tools mounted on said primary frame rearwardly of said disk gang and adapted to penetrate the ground when said wheel means is adjusted to lower said primary frame relative to ground.

9. An agricultural implement comprising, in combination, a primary frame having front and rear ends and defining a longitudinal axis, hitch means connected to the front end of said primary frame for enabling said primary frame to be drawn generally in the direction of its longitudinal axis, a secondary support frame juxtaposed to said primary frame intermediate said front and rear ends thereof, said secondary support frame extending substantially transverse to the longitudinal axis of said primary frame and having a framework defining forward and rearward ends of said secondary support frame, a pair of laterally spaced parallel links pivotally connecting said rearward end of said secondary support frame to said primary frame, a pair of laterally spaced depth control screws connecting said forward end of said secondary support frame to said primary frame and cooperating with said parallel links to support said secondary support frame in generally parallel relation to the plane of said primary frame and enabling selective adjustment of said secondary support frame relative to said primary support frame while maintaining said parallel relation therebetween, a generally triangular pivot link pivotally connecting said rearward end of said secondary frame to said primary frame at approximately midlength of said secondary support frame, an additional depth control adjusting screw connected between said triangular pivot link and said forward end of said secondary frame and being adjustable to vary the orientation of the center area of said secondary support frame relative to said primary frame independently of said pair of laterally spaced depth control adjusting screws, first tool means mounted on said secondary support frame for movement therewith relative to said primary frame, second tool means mounted on said primary frame between one of said front and rear ends thereof and said secondary support frame, and wheel means mounted on said primary frame and selectively adjustable relative to said primary frame to enable raising of said primary frame and said secondary support frame to positions wherein said first and second tool means are raised from the ground for transport of said implement, and to enable lowering of said primary frame and secondary support frame to positions facilitating ground engagement of said first and second tool means.

* * * * *